United States Patent
Ganille et al.

(10) Patent No.: US 10,262,463 B2
(45) Date of Patent: Apr. 16, 2019

(54) METHOD FOR GRAPHICALLY REPRESENTING AN IMAGE FROM AN IMAGE SENSOR SUPERIMPOSED ON A SYNTHETIC SECOND IMAGE OF THE OUTSIDE LANDSCAPE

(71) Applicant: THALES, Courbevoie (FR)

(72) Inventors: Thierry Ganille, Merignac (FR); Johanna Lux, Le Haillan (FR); Baptiste Perrin, Merignac (FR); Daniel Maulet, Saint Marcel les Valence (FR)

(73) Assignee: THALES, Courbevoie (FR)

( * ) Notice: Subject to any disclaimer, the term of this patent is extended or adjusted under 35 U.S.C. 154(b) by 94 days.

(21) Appl. No.: 15/390,438

(22) Filed: Dec. 23, 2016

(65) Prior Publication Data
US 2017/0186238 A1 Jun. 29, 2017

(30) Foreign Application Priority Data
Dec. 23, 2015 (FR) .................................. 15 02679

(51) Int. Cl.
*G06T 17/05* (2011.01)
*G06T 19/00* (2011.01)
(Continued)

(52) U.S. Cl.
CPC ............ *G06T 19/006* (2013.01); *G01C 23/00* (2013.01); *G06T 11/00* (2013.01); *G06T 15/503* (2013.01);
(Continued)

(58) Field of Classification Search
CPC ........ G06T 11/00; G06T 11/001; G06T 11/60; G06T 7/11; G06T 5/003; G06T 15/503;
(Continued)

(56) References Cited

U.S. PATENT DOCUMENTS 6,961,070 B1 * 11/2005 Madison .................... F41J 5/14
273/351
2012/0026190 A1 * 2/2012 He .......................... G01C 21/00
345/633
(Continued)

OTHER PUBLICATIONS

French Search Report for corresponding French Patent Application No. 1502679, 9 pp., (dated Sep. 23, 2016).
Max Olson, "Photoshop Tutorial: Blend Images", Y-Designs, Inc., retrieved from the Internet on Sep. 16, 2016: http://y-designs.com/tutorials/photoshop-tutorial-blend-images/, XP055303221, 9 pp., (Nov. 13, 2015).
(Continued)

*Primary Examiner* — Jin Cheng Wang
(74) *Attorney, Agent, or Firm* — Womble Bond Dickinson (US) LLP

(57) ABSTRACT

The general field of the invention is that of the methods for graphically representing a first image from an image sensor of the outside landscape superimposed on a second image representing a synthetic image of the same outside landscape, the two images being displayed on a display screen of an onboard display system for aircraft. The first image comprises three rectangular zones of increasing transparency, each zone having a width equal to that of the first image and a determined height, the sum of the three heights being equal to the height of the first image, the first zone situated at the bottom of the image having a first constant level of transparency, the third zone situated at the top of the image having a second constant level of transparency greater than the first level of transparency, the second zone situated between the first zone and the third zone having a level of transparency that is continuously variable between the first level and the second level.

10 Claims, 2 Drawing Sheets

(51) Int. Cl.
*G08G 5/00* (2006.01)
*G06T 15/50* (2011.01)
*G01C 23/00* (2006.01)
*G06T 11/00* (2006.01)

(52) U.S. Cl.
CPC .......... *G06T 17/05* (2013.01); *G08G 5/0086* (2013.01); *G06T 2200/04* (2013.01); *G06T 2210/62* (2013.01)

(58) Field of Classification Search
CPC ... G06T 17/05; G06T 19/006; G06T 2200/04; G06T 2210/62; G09G 5/02; G01C 21/00; G01C 23/00
USPC .................................................. 345/629, 633
See application file for complete search history.

(56) References Cited

U.S. PATENT DOCUMENTS

| 2013/0147823 | A1* | 6/2013 | Jain ....................... G06T 15/503 345/589 |
| 2014/0267422 | A1* | 9/2014 | Feyereisen ............. B64D 45/00 345/634 |
| 2017/0178373 | A1* | 6/2017 | Sarafa .................. G06T 11/001 |

OTHER PUBLICATIONS

Oleg Vygolov, et al., "Chapter 8: Enhanced, Synthetic and Combined Vision Technologies for Civil Aviation", Computer Vision in Control Systems—2, XP009191658, pp. 201-230, (Jan. 2015).

* cited by examiner

METHOD FOR GRAPHICALLY REPRESENTING AN IMAGE FROM AN IMAGE SENSOR SUPERIMPOSED ON A SYNTHETIC SECOND IMAGE OF THE OUTSIDE LANDSCAPE

FIELD

The field of the invention is that of the human-system interfaces for aeronautical applications, and more particularly that of the display systems combining a real image from one or more sensors, and a synthetic image. These systems are known by the acronym "CVS", standing for "Combined Vision System".

BACKGROUND

Modern aircraft generally have a first synthetic vision system, called "SVS". This system makes it possible to present the crew with a synthetic image of the outside landscape generally comprising piloting or navigation information. An SVS system comprises a mapping database representative of the terrain being flown over, a geolocation system and electronic computation means. The image displayed is a three-dimensional view of the outside represented as realistically as possible.

These aircraft also have a second display system called "EVS", the acronym for "Enhanced Vision System". This second system comprises one or more sensors which can be optical sensors in the visible or infrared range or intensified imaging, or lidars or even radars. The image is generally processed.

The combined image obtained from the SVS and EVS images is called CVS. It is displayed on the display screens which are located on the front face of the instrument panel of the aircraft. The point of view displayed is in the axis of the aircraft.

The CVS image is an interesting solution for operations called "EVO", the acronym for "Equivalent Visual Operations", for aircraft operating in flight by instruments, a flight called "IFR" for "Instrument Flight Rules", or even to improve the safety of flights of aircraft operating in flight with degraded view, flights called "VFR" with a degraded visual environment, VFR being the acronym for "Visual Flight Rules". The SVS image enhances the awareness of the situation with regard to the far terrain whereas the EVS image does so for the near terrain, rendering the combination of the two images particularly relevant.

The superimposing of the SVS and EVS images is not necessarily simple. One possible solution consists in superimposing all of the EVS image on the SVS, thus masking a useful part of the SVS, possibly with a realignment of the SVS on the EVS by identification of a notable element such as a landing runway, which limits the cases of use to, for example, landing on a runway. A second solution is to display the EVS image only under the horizon and to display the SVS image only above the horizon. This all-or nothing solution does not always exploit all the potential of the two images. A third solution consists in detecting the zones with a contrast higher than a threshold in the EVS image and superimposing only these zones on the SVS image. Here again, the risk of losses of useful information is not negligible.

SUMMARY

The method according to the invention does not present the drawbacks of the above solutions. The method relies on the subdividing of the EVS image into three distinct parts. The bottom part of the EVS image has a maximum opacity and can potentially totally mask the SVS image, the top part of the EVS image has a minimal opacity and the intermediate part presents the EVS image with opacity degraded between the maximum value at the bottom and minimum value at the top. More specifically, the subject of the invention is a method for graphically representing a first image from an image sensor of the outside landscape superimposed on a second image representing a synthetic image of the same outside landscape, the two images being displayed on a display screen of an onboard display system for aircraft, characterized in that the first image comprises three rectangular zones of increasing transparency, each zone having a width equal to that of the first image and a determined height, the sum of the three heights being equal to the height of the first image, the first zone situated at the bottom of the image having a first constant level of transparency, the third zone situated at the top of the image having a second constant level of transparency greater than the first level of transparency, the second zone situated between the first zone and the third zone having a level of transparency that is continuously variable between the first level and the second level.

Advantageously, the height of the first zone represents 30% of the height of the image, the height of the second zone represents 50% of the height of the image and the height of the third zone represents 20% of the height of the image.

Advantageously, the first level of transparency is nil or close to zero and the second level of transparency is close to 100%.

Advantageously, the law of variation of the level of transparency of the second zone is linear.

Advantageously, the heights of the three zones can be adjusted manually by a user.

Advantageously, the heights of the three zones can be adjusted automatically by the onboard avionics system as a function of the flight phase of the aircraft.

Advantageously, the heights of the three zones can be adjusted automatically by the onboard avionics system as a function of one or more parameters of the aircraft such as the pitch, the altitude or the radio altitude.

Advantageously, the heights of the three zones can be adjusted automatically by the onboard avionics system as a function of a distance to the terrain in the field of the sensor computed from the terrain database.

Advantageously, the heights of the three zones can be adjusted automatically by the onboard avionics system as a function of the limit of visibility of the image sensor.

Advantageously, the first level of transparency and/or the second level of transparency vary as a function of the altitude of the aircraft when the aircraft is ascending, so that the first image is increasingly transparent as a function of the altitude, the changes of levels of transparency beginning at a first low altitude threshold and ending at a second high altitude threshold, the first image being totally transparent at this second threshold.

Advantageously, the first level of transparency and/or the second level of transparency vary as a function of the altitude of the aircraft when the aircraft is descending, so that the first image is increasingly opaque as a function of the altitude, the changes of levels of transparency beginning at a third high altitude threshold and ending at a fourth low altitude threshold, the first image being totally transparent at the third threshold.

Advantageously, the first threshold and the fourth threshold have different values and/or the second threshold and the third threshold have different values.

BRIEF DESCRIPTION OF THE DRAWING

The invention will be better understood and other advantages will become apparent on reading the following description given in a nonlimiting manner and by virtue of the attached figures in which.

DETAILED DESCRIPTION

The method according to the invention is implemented in an avionics system for aircraft. The latter comprises at least one synthetic vision system and one or more image sensors.

The synthetic vision system, or SVS, comprises at least one cartographic database, geolocation means, electronic means for computing a representation of the main parameters of the aircraft, a graphics computer and at least one display device. The geolocation means are, by way of example, of "GPS" type, GPS being the acronym for "Global Positioning System", coupled/hybridized or not with inertial units.

The second vision system, called "EVS", the acronym for "Enhanced Vision System", comprises one or more sensors which can be optical sensors in the visible or the infrared range or intensified imaging, or lidars or even radars. The image is generally processed.

Hereinbelow, the terms opacity and transparency are employed. The level of opacity of an image expressed as a percentage is equal to 100% minus its level of transparency expressed as a percentage.

Figure 1:
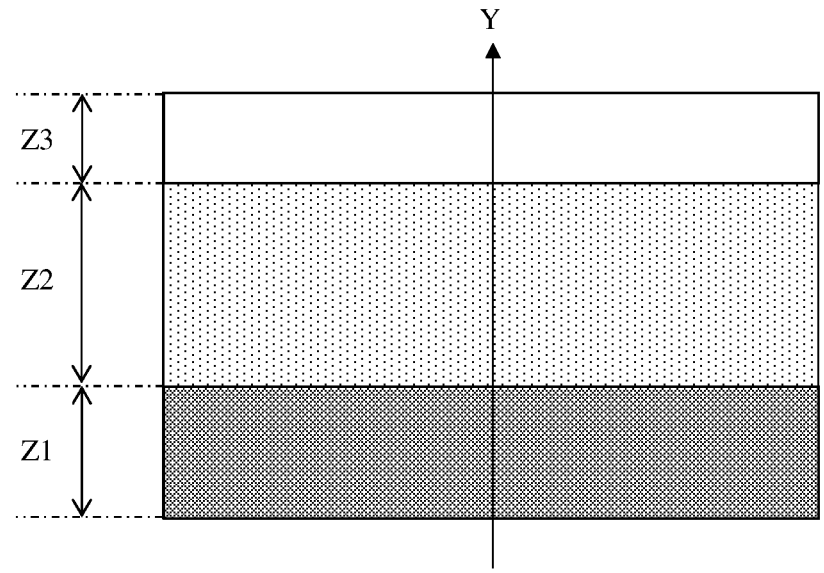
FIG. 1 represents the different zones of the first image from a sensor.

In the method according to the invention, the EVS image is subdivided into three distinct and connected rectangular zones from bottom to top as can be seen in FIG. 1. In this figure, the zones are denoted Z1, Z2 and Z3. The bottom part Z1 presents the EVS image with a maximum opacity or, what amounts to the same thing, a minimum transparency, the top part Z3 represents the EVS image with a minimum opacity or a maximum transparency and the intermediate part Z2 presents the EVS image with opacity degraded between the maximum value at the bottom and minimum value at the top or with transparency degraded between the minimum value at the bottom and maximum value at the top.

To give orders of magnitude, the height of the first zone Z1 represents 30% of the height of the image, the height of the second zone Z2 represents 50% of the height of the image and the height of the third zone Z3 represents 20% of the height of the image. Other distributions are possible.

Figure 2:
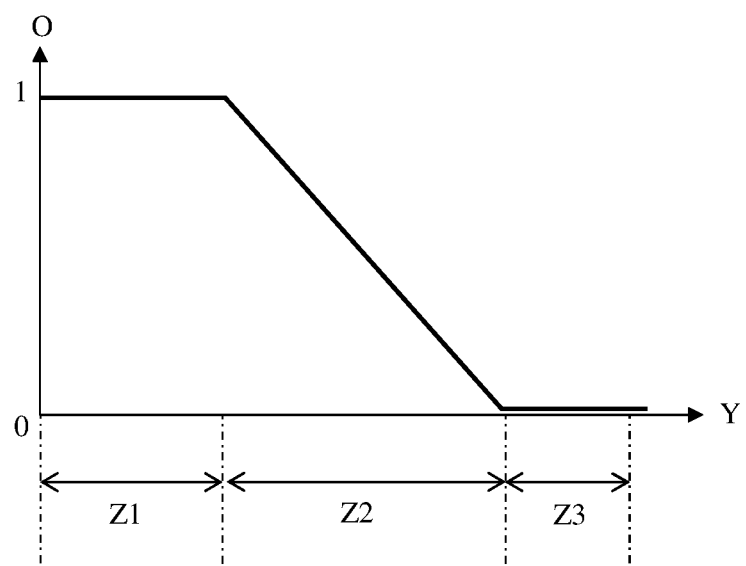
FIG. 2 represents, on a vertical axis, the variation of transparency of the first image.

As represented in FIG. 2, the opacity of each point in the intermediate zone Z2 is a function of its distance on the vertical axis Y to the bottom edge of the image according to a law of constantly decreasing variation. The law of variation can be of different kind. In FIG. 2, the law of variation is linear. Other variations are possible.

By way of example, the first level of transparency is nil or close to zero and the second level of transparency is close to 100%. Specifically, the second level of transparency is greater than 80% and strictly less than 100%.

The distribution of the three zones can be constant and independent of the flight phases of the aircraft. A variant of the method according to the invention consists in making the distribution of the three zones variable. Different modes are then advantageous:

a manual mode in which the pilot sets the distribution of the three zones from a single command;

an automatic mode where the distribution of the zones is a function of one or more parameters of the aircraft, for example the pitch, the altitude or even the radio altitude. Thus, the closer the aircraft approaches to the ground and/or the more the aircraft assumes a negative pitch, the more the zone Z1 is enlarged;

an automatic mode in which the distribution of the zones is a function of the detection in the EVS image of a horizontal straight line subject to the limit of visibility of the sensor at a given time. This detection relies on an analysis of the contrasts in the EVS image.

An automatic mode in which the distribution of the zones is a function of the detection in the SVS image of a horizontal straight line passing through the lowest point in the field of the sensor for which the distance to the aircraft is greater than a given value, for example 500 meters.

When the aircraft is very high above the terrain, the EVS image is no longer of interest and only an SVS image is presented. One possible solution for avoiding the abrupt appearance or disappearance of the first image consists in introducing a soft transition between the SVS image alone and the EVS image made up of the three rectangular zones described previously, when the aircraft approaches the ground or moves away therefrom.

In this case, the first level of transparency and/or the second level of transparency vary as a function of the altitude of the aircraft when the aircraft is ascending, so that the first image is increasingly transparent as a function of the altitude, the changes of levels of transparency beginning at a first low altitude threshold called start-of-disappearance threshold, and ending at a second high altitude threshold called end-of-disappearance threshold, the first image being totally transparent at this second threshold.

The first level of transparency and the second level of transparency vary also as a function of the altitude of the aircraft when the aircraft is descending, so that the first image is increasingly opaque as a function of the altitude, the changes of levels of transparency beginning at a third high altitude threshold called end-of-appearance threshold, and ending at a fourth low altitude threshold called start-of-appearance threshold, the first image being totally transparent at the third threshold.

These appearance and disappearance thresholds do not necessarily coincide. Advantageously, the start-of-disappearance threshold is higher than the start-of-appearance threshold and, similarly, the end-of-disappearance threshold is higher than the end-of-appearance threshold.

By way of example, the average variation of transparency of the first image can be linear as a function of the altitude between the appearance and disappearance thresholds. Other variations are possible.

These appearance and disappearance thresholds are defined so as to avoid fleeting appearances and disappearances, regardless of the profile of the flight and the nature of the terrain.

Figure 3:
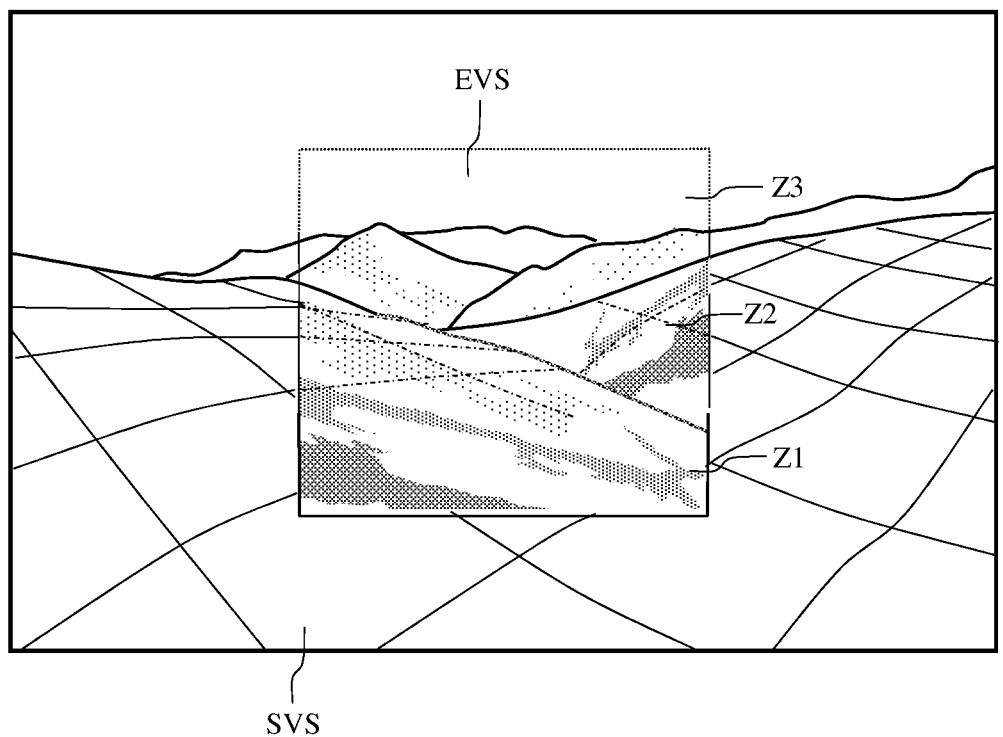
FIG. 3 represents a display comprising the superimposition of the first image on the second image.

By way of example, FIG. 3 represents the integration of an EVS image in an SVS image obtained with the method according to the invention. The SVS image comprises the lines of a grid which disappear at the bottom of the EVS image in the zone Z1 which is totally opaque and which reappear in the zone Z2 as their location rises in the EVS image which is increasingly transparent and totally transparent in the zone Z3.

What is claimed is:

1. A method for graphically representing a first image from an image sensor of the outside landscape superimposed on a second image representing a synthetic image of the same outside landscape, the method comprising:
    displaying the first image and the second image on a display screen of an onboard display system for aircraft, wherein the first image comprises three rectangular zones of increasing transparency, each zone having a width equal to that of the first image and a determined height, the sum of the three heights being equal to the height of the first image, the first zone situated at the bottom of the image having a first constant level of transparency, the third zone situated at the top of the image having a second constant level of transparency greater than the first level of transparency, the second zone situated between the first zone and the third zone having a level of transparency that is continuously variable between the first level and the second level, the heights of the three zones being adjusted automatically by the onboard avionics system as a function of the altitude or the radio altitude of the aircraft.

2. The method of claim 1 wherein the height of the first zone represents 30% of the height of the image, the height of the second zone represents 50% of the height of the image and the height of the third zone represents 20% of the height of the image.

3. The method of claim 1 wherein the first level of transparency is nil or close to zero and in that the second level of transparency is greater than 80% and strictly less than 100%.

4. The method of claim 1 wherein the law of variation of the level of transparency of the second zone is linear.

5. The method of claim 1 wherein the heights of the three zones can be adjusted automatically by the onboard avionics system as a function of the flight phase of the aircraft.

6. The method according to claim 1 wherein the heights of the three zones can be adjusted automatically by the onboard avionics system as a function of a distance to the terrain in the field of the sensor computed from the terrain database.

7. The method of claim 1 wherein the heights of the three zones can be adjusted automatically by the onboard avionics system as a function of the limit of visibility of the image sensor.

8. The method of claim 1 wherein the first level of transparency and/or the second level of transparency vary as a function of the altitude of the aircraft when the aircraft is ascending, so that the first image is increasingly transparent as a function of the altitude, the changes of levels of transparency beginning at a first low altitude threshold and ending at a second high altitude threshold, the first image being totally transparent at the second high altitude threshold.

9. The method of claim 1 wherein the first level of transparency and the second level of transparency vary as a function of the altitude of the aircraft when the aircraft is descending, so that the first image is increasingly opaque as a function of the altitude, the changes of levels of transparency beginning at a third high altitude threshold and ending at a fourth low altitude threshold, the first image being totally transparent at the third high altitude threshold.

10. The method of claim 9 wherein the first low altitude threshold and the fourth low altitude threshold have different values and/or the second high altitude threshold and the third high altitude threshold have different values.

* * * * *